United States Patent
Bielek et al.

(10) Patent No.: US 9,777,168 B2
(45) Date of Patent: Oct. 3, 2017

(54) LIQUID FORMULATIONS FOR COATING AND PRINTING SUBSTRATES

(75) Inventors: Yan Bielek, Cumberland, RI (US); Philip R. Emery, Barre, MA (US)

(73) Assignee: FLEXcon Company, Inc., Spencer, MA (US)

( * ) Notice: Subject to any disclaimer, the term of this patent is extended or adjusted under 35 U.S.C. 154(b) by 196 days.

(21) Appl. No.: 12/894,526

(22) Filed: Sep. 30, 2010

(65) Prior Publication Data

US 2011/0104376 A1     May 5, 2011

Related U.S. Application Data

(62) Division of application No. 11/132,520, filed on May 19, 2005.

(60) Provisional application No. 60/572,333, filed on May 19, 2004.

(51) Int. Cl.

| | |
|---|---|
| *B05D 3/02* | (2006.01) |
| *C09D 7/00* | (2006.01) |
| *B82Y 30/00* | (2011.01) |
| *C09D 7/12* | (2006.01) |
| *C09D 11/03* | (2014.01) |
| *C09D 11/52* | (2014.01) |
| *C08L 79/08* | (2006.01) |

(52) U.S. Cl.
CPC .............. *C09D 7/002* (2013.01); *B82Y 30/00* (2013.01); *C09D 7/1291* (2013.01); *C09D 11/03* (2013.01); *C09D 11/52* (2013.01); *C08L 79/08* (2013.01)

(58) Field of Classification Search
CPC ...... C09D 7/002; C09D 7/1291; C09D 11/03; C09D 11/52; C08L 79/08
USPC .......................................................... 516/32
See application file for complete search history.

(56) References Cited

U.S. PATENT DOCUMENTS

| | | | | |
|---|---|---|---|---|
| 2,957,826 | A | * | 10/1960 | Martinek ...................... 508/513 |
| 3,082,108 | A | * | 3/1963 | Julius ....................... 106/287.13 |
| 3,308,078 | A | * | 3/1967 | Rogers et al. ................ 524/272 |
| 3,320,187 | A | * | 5/1967 | Burt ............................... 521/128 |
| 3,425,964 | A | * | 2/1969 | Stanley ......................... 521/128 |
| 3,684,733 | A | | 8/1972 | Bannister et al. |
| 3,880,569 | A | | 4/1975 | Bannister et al. |
| 3,901,727 | A | * | 8/1975 | Loudas .............................. 134/4 |
| 3,976,627 | A | | 8/1976 | Morris |
| 4,151,138 | A | | 4/1979 | Citrone et al. |
| 4,469,856 | A | * | 9/1984 | Rasshofer et al. .............. 528/45 |
| 4,500,656 | A | | 2/1985 | Rasshofer et al. |
| 5,254,159 | A | | 10/1993 | Gundlach et al. |
| 5,279,652 | A | | 1/1994 | Kaufmann et al. |
| 5,726,251 | A | | 3/1998 | Wilkinson et al. |
| 5,811,070 | A | * | 9/1998 | You ............................... 423/432 |
| 5,907,024 | A | * | 5/1999 | Ohrbom et al. ................. 528/75 |
| 6,096,125 | A | * | 8/2000 | Breton et al. ............... 106/31.43 |
| 6,262,169 | B1 | * | 7/2001 | Helmer et al. ................. 524/555 |
| 6,288,141 | B1 | | 9/2001 | Malhotra et al. |
| 6,368,569 | B1 | | 4/2002 | Haddon et al. |
| 6,467,897 | B1 | | 10/2002 | Wu et al. |
| 6,528,613 | B1 | | 3/2003 | Bui et al. |
| 6,589,918 | B2 | * | 7/2003 | Denpo et al. .................. 508/100 |
| 7,074,310 | B2 | | 7/2006 | Smalley et al. |
| 7,161,107 | B2 | | 1/2007 | Krupke et al. |
| 7,691,294 | B2 | * | 4/2010 | Chung ..................... C09D 5/24 242/159 |
| 7,955,528 | B2 | * | 6/2011 | Chung ..................... C09D 5/24 106/31.43 |
| 2002/0172639 | A1 | * | 11/2002 | Horiuchi et al. ........... 423/447.2 |
| 2003/0101901 | A1 | | 6/2003 | Bergemann et al. |
| 2003/0104241 | A1 | * | 6/2003 | Rasshofer ...................... 428/626 |
| 2005/0255031 | A1 | | 11/2005 | Jung et al. |
| 2005/0276924 | A1 | | 12/2005 | Bielek et al. |
| 2006/0045838 | A1 | | 3/2006 | Lucien Malenfant et al. |
| 2006/0054555 | A1 | | 3/2006 | Sun |
| 2006/0242741 | A1 | | 10/2006 | Krupke et al. |
| 2006/0257773 | A1 | | 11/2006 | Wong et al. |
| 2006/0278579 | A1 | | 12/2006 | Choi et al. |
| 2008/0206488 | A1 | * | 8/2008 | Chung ..................... C09D 5/24 427/596 |
| 2009/0035707 | A1 | | 2/2009 | Wang et al. |

FOREIGN PATENT DOCUMENTS

| | | |
|---|---|---|
| JP | 6166838 | 6/1994 |
| JP | 9129141 A | 5/1997 |
| WO | WO99/21927 | 5/1999 |

OTHER PUBLICATIONS

Machine Translation of Publ. No. JP H09-129141, published May 1997, Japan patent Office, Tokyo, Japan, obtained online @ http://dossier1.ipdl.inpit.go.jp/AIPN/odse_top_dn.ipdl?N0000=7400 (Downloaded Feb. 25, 2013).*
Robert W. Messier, Jr, Chapter 5—Adhesives, Cements, Mortars, and the Bonding Process, Joining of Materials and Structures, Amsterdam : Elsevier. 2004, pp. 227 and 238.*
D. Chattopadhyay et al., "A Route for Bulk Separation of Semi-conducting from Metallic Single-Wall Carbon Nanotubes," JACS Articles: American Chemical Society 2003, vol. 125, No. 11, pp. 3370-3375.
Chattopadhyay et al., "Length Separation of Zwitterion-Functional-ized Single Wall Carbon Nanotubes by GPS", J. Am. Chem. Soc., vol. 124, No. 5, 2002, pp. 728-729, American Chemical Society.
Al-Dohoudi et al., "Wet Coating Deposition of ITO Coatings on Plastic Substrates", Journal of Sol-Gel Science and Technology 26, 2003, pp. 693-697, Kluwer Academic Publishers, The Netherlands.
Sztrum et al., "Self-Assembly of Nanoparticles in Three-Dimensions: Formation of Stalagmites", J. Phys. Chem. B, 109 (14), 2005, pp. 6741-6747, American Chemical Society Publications.

(Continued)

*Primary Examiner* — Daniel S Metzmaier
(74) *Attorney, Agent, or Firm* — Gesmer Updegrove LLP

(57) ABSTRACT

A method is disclosed of preparing a liquid formulation for application as a deposit on a substrate. The method includes the steps of providing a liquid having a first viscosity in a non-evaporative state; and adding an amine-acid adduct to the liquid to form a mixture having a second viscosity greater than the first viscosity. The amine-acid adduct is evaporative such that the amine-acid adduct is substantially completely removed from the deposit in a functionally dry state.

54 Claims, No Drawings

(56) References Cited

OTHER PUBLICATIONS

K.B. Shelimov et al., "Purification of Single-Wall Carbon Nanotubes by Ultrasonically assisted Filtration," Chemical Physics Letters 282 (1998), pp. 429-434.
J. Hilding et al., "Sorption of Butane on Carbon Multiwall Nanotubes at Room Temperature," Langmuir 2001, 17, pp. 7540-7544.
Saran, N. et al., "Fabrication and Characterization of Thin Films of Single-Wall Carbon Nanotube Bundles on Flexible Plastic Substrates," J. Am. Chem. Soc, 2004, 126, pp. 4462-4463.
O.V. Pupysheva et al., "Interaction of Single-Walled Carbon Nanotubes with Alkylamines: An Ab Initio Study", Thin Solid Films 499, 2006, pp. 256-258.
N. Choi et al., "Effects of Amines on Single-Walled Carbon Nanotubes in Organic Solvents: Control of Bundle Structures," Jpn. J. Appl, Phys. vol. 41, 2002, pp. 6264-6266.
Partial English Translation of Japanese Notice of Rejection issued on Jan. 15, 2013 in connection with Japanese Patent Application No. 2007-527464, 3 pages.
Chang, Potentiometric Titration of Free Amine and Amine Carbonate in Carbonated Monoethanolamine Solutions, Analytical Chemistry, Jun. 1958, pp. 1095-1097, vol. 30, No. 6.
Carbamodithioc acid, N, N-diethyl-, ammonium salt (1:1), online @ http://www.lookchem.com/cas-211/21124-33-4.html (copyright date 2008) (downloaded Sep. 29, 2010), 2 pages.
1H-Imidazole-5-methanol, hydrochloride (1:1), online @ http://www.lookchem.com/cas-592/592-35-8.html (copyright date 2008) (downloaded Sep. 29, 2010), 3 pages.
Carbamic acid, N-(2-hydroxyethyl)-, phenylmethyl ester, online @ http://www.lookchem.com/cas-603/803-52-1.html (copyright date 2008) (downloaded Sep. 29, 2010), 2 pages.
R. Andrews et al., "Separation of $CO_2$ from Flue Gases by Carbon-Multiwall Carbon Nanotube Membrane", Office of Science and Technical Information, www.osti.gov, pp. 1-17, Mar. 2001.
Sigma-Aldrich online catalog. Aldrich # 167398, t-butyl carbamate (copyright 2013) online @ http://www.sigmaaldrich.com/catalog/product/aldrich/167398?lang=US# (downloaded Mar. 12, 2013), 1 page.
English Translation of Japanese Notice of Rejection issued on Aug. 27, 2013 in connection with Japanese Patent Appln. No. 2011-181538, 2 pages.
Office Action and Translation from Japanese Patent Office issued in related Japanese Patent Application 2011-181538 dated Oct. 17, 2014.
Office Action issued by the Japanese Patent Office on Jun. 30, 2015 in related Japanese Patent Application No. 2011-181538 and English translation thereof, 4 pages.
International Preliminary Report on Patentability issued on Nov. 21, 2006 in connection with International Patent Appl. No. PCT/US2005/017683.
Hearing Notice U/S 14 of the Patents Act, 1970, dated Oct. 26, 2010 in connection with Indian Patent Appln. No. 6773/DELNP/2006.
Japanese Decision of Rejection issued on Apr. 26, 2011 in connection with Japanese Patent Appln. No. 2007-527464.
English Translation of the Japanese Office Action issued on Sep. 18, 2012 in connection with Japanese Patent Application Serial No. 2007-527464.

* cited by examiner

LIQUID FORMULATIONS FOR COATING AND PRINTING SUBSTRATES

CROSS REFERENCE TO RELATED APPLICATIONS

This application claims priority to U.S. patent application Ser. No. 11/132,520 filed May 19, 2005, which claims priority to U.S. Provisional Patent Application No. 60/572,333 filed May 19, 2004.

BACKGROUND OF THE INVENTION

1. Field of the Invention

This invention relates generally to liquid formulations designed for application to substrates as coatings, printed patterns or the like, and is concerned in particular with a formulation comprising a mixture of a liquid and volatile viscosity altering components, the latter being substantially completely evaporative when the mixture is applied to a substrate and processed to its functionally dried state.

2. Description of the Prior Art

There are solutions and dispersions, which are used as coatings or printing inks that are best applied from a very dilute state, such as in a water or non-aqueous medium. In many cases, however, the rheology of these coatings or inks may cause them to flow too freely to allow for proper control of the amount of their application. Further, if discreetly applied, they may flow too freely to maintain their target positions.

There exists an abundance of rheology control agents, commonly referred to as "thickening agents", which can be incorporated in the continuous liquid phase of a system to modify its viscosity to an appropriate level (i.e. one which meets the requirements of the application method). Unfortunately, when used in systems which are subsequently dried, the thickening agent left behind is often of a high enough concentration to adversely affect the performance of the coating or printing.

The printing of conductive inks and the application of optical coatings are two non-limiting examples where this dichotomy exists between the requirement of elevated viscosity for application purposes and purity in the functionally dried state. The dielectric properties of residual thickening agents can disadvantageously reduce the conductivity of conductive ink deposits, and the opacity of such residual thickening agents can introduce haze that adversely affects the desired clarity of optical coatings.

A need exists, therefore, for coating and ink formulations having rheologies that have been adjusted by the incorporation of thickening agents to achieve viscosities appropriate for the intended application modes, with the thickening agents being substantially completely removed from the resulting coating or ink deposits in their functionally dried states as applied to the substrates.

As herein employed, "functionally dried state" means that the volatile components of a liquid mixture have been evaporated to an extent sufficient to place the mixture in condition for its intended use.

Again, as herein employed, a component of a liquid mixture is considered to have been "substantially completely removed" when any residue of the component does not prevent the mixture, when in its functionally dried state, from performing its intended use.

SUMMARY OF THE INVENTION

In accordance with an embodiment, the invention provides a method of preparing a liquid formulation for application as a deposit on a substrate. The method includes the steps of providing a liquid having a first viscosity in a non-evaporative state; and adding an amine-acid adduct to the liquid to form a mixture having a second viscosity greater than the first viscosity. The amine-acid adduct is evaporative such that the amine-acid adduct is substantially completely removed from the deposit in a functionally dry state.

In accordance with another embodiment, the invention provides a method of preparing a formulation for application on a substrate. The method includes the steps of providing a liquid having a first viscosity; combining an amine with the liquid; and adding an acid to the liquid amine combination to form a mixture, such that the amine and acid form an amine-acid adduct. The amine-acid adduct comprises more than 10% by weight of said mixture, and the mixture has a second viscosity greater than said first viscosity. The amine-acid adduct is evaporative to a reduced level of less than about 0.1% by weight of the deposit in a functionally dry state as applied to the substrate.

In accordance with yet another embodiment, the invention provides a method of coating or printing a substrate with a liquid. The method includes the steps of providing a liquid having a first viscosity; providing an amine-acid adduct; combining the liquid with the amine-acid adduct to form a mixture having a second viscosity greater than the first viscosity; applying the mixture as a deposit on the surface of the substrate; and drying the deposit to a functionally dry state in which the amine-acid adduct is substantially completely removed from the deposit.

In accordance with a further embodiment, the invention provides a method of coating or printing a substrate with a liquid. The method includes the steps of providing a liquid having a first viscosity; providing an amine; combining the liquid with the amine; adding an acid to the liquid and amine to form a mixture having a second viscosity greater than the first viscosity, with the amine and acid forming an amine-acid adduct; applying the mixture as a deposit on the substrate; and drying the deposit to a functionally dry state in which the amine-acid adduct is substantially completely removed from the deposit.

DETAILED DESCRIPTION

The present invention employs the amine carbamate as a viscosity control agent for a range of solutions/dispersions from hydrocarbons to alcohols to water. Primary and secondary amines are candidates; tertiary amines are not useful.

The amines, when treated with $CO_2$ form the amine carbamate (and with water can form the amine carbonate). This zwitter ion salt formed can, as is the case of fatty acid esters and salts, be used to alter the rheology of a liquid in which such salts are compatible.

The use of amines, especially those that have a boiling point at about the temperature of that of the solvent or the continuous phase of a liquid mixture, allows the carbamate (carbonate) to break down (release $CO_2$) and the amine to evaporate off with the other volatile components of the mixture. In the course of applying the mixture to a substrate and processing it to its functionally dried state, the carbamate (carbonate) is substantially completely removed, with any residue being as low as 0.2%, typically less than 0.1%, preferably less than 0.01%, and most preferably less than 0.001% by weight of the thus applied and processed mixture.

Applications where this type of rheology control is advantageous include, for example:

(a) Nanotechnology, where the elements being coated are often in very dilute concentration, but the coatings need a higher viscosity to allow even placement. This is of particular interest when dealing with carbon nanotubes, where viscosity control not only facilitates application, but also has a stabilizing effect in preventing the nanotubes from entangling in the carrier liquid, thus agglomerating and falling out of the carrier liquid before coating, discrete coating, or printing.

(b) The application of optical coatings, e.g., for film based vision driven user interfaces (displays, touchscreens), clear protective coatings for graphics, etc., where clarity of the functionally dried deposit is a prime requirement.

(c) Other contamination-sensitive coatings that are used in electronic product fabrication. For example, use of "ink jet" type of coatings (printing) used in placement of resist coatings; or adhesion treatments for discrete placement of conductive elements in a circuit.

In the following examples, liquid mixtures were prepared using one or more of the following components:

CNT Ink Concentrate (3000 ppm CNT) obtained from Eikos in Franklin, Mass.

Solvent Ink Concentrate #7633-41P obtained from Raffi & Swanson in Wilmington, Mass.

Diluting Acrylate IBOA (Isobornyl Acrylate) obtained from Surface Specialties UCB in Smyrna, Ga.

UV Coating ECX 4019 obtained from Cognis Corporation in Ambler, Pa.

Example 1

| Conductive Ink | | |
|---|---|---|
| WB Carbamate: | sec-Butyl Amine | 90 grams |
| | Water | 10 grams |
| | $CO_2$ | Bubble through until viscosity 11,500-12,500 cP |
| CNT Ink Formula: | CNT Ink Concentrate (3000 ppm CNT) | 1% |
| | Water | 21% |
| | Solvent (IPA) | 50% |
| | Carbamate | 28% |
| | | 100% |

Starting viscosity of ink concentrate 30-100 cP
Final viscosity of mixture 1500-2000 cP Example 2

| Optical Coating | | |
|---|---|---|
| Carbamate: | n-Butyl Amine | 50 grams |
| | Solvent | 50 grams |
| | $CO_2$ | Bubble through until viscosity 10,000 cP |
| Solvent Ink Formula: | Solvent Ink Concentrate | 10% |
| | Solvent | 70% |
| | Carbamate | 20% |
| | | 100% |

Starting viscosity of concentrate 100-200 cP
Final viscosity of concentrate 1000-1200 cP Example 3

| Optical Coating | | |
|---|---|---|
| Carbamate: | n-Propyl Amine | 20 grams |
| | Diluting Acrylate | 80 grams |
| | $CO_2$ | Bubble through until viscosity 10,000 cP |
| UV Coating Formula: | UV Coating | 79% |
| | Carbamate | 21% |
| | | 100% |

Starting viscosity of UV coating 200-250 cP
Final viscosity of mixture 1500-1800 cP The mixtures of Examples 1-3 were applied to a clear polyester film using a Meyer drawdown rod and processed to their functionally dried state in a laboratory oven at 70° C. for one minute. The resulting dried deposits were tested for residual carbamate components using a pHydrion Insta-Check Surface pH Pencil (available from VWR International of West Chester, Pa., U.S.A.). In each case, the pH reading ranged between 5 and 6.

Based on the definition of pH (the chemical fact that pH is the negative logarithmic function of the concentration of the hydrogen ion, written as the equation $pH=-\log [H^+]$ from Holtzclaw et. al. *General Chemistry, p.* 459, 1984, D. C, Heath and Co., Lexington, Mass.), the higher the concentration of the hydrogen ion, the lower the pH. Any residual amine component of the carbamates would decrease the hydrogen ion concentration and thereby increase the pH as measured in this test.

Using this method of calculation, and based on the pH readings recited above, the residual carbamate concentrations in the functionally dried residues of Examples 1-3 were determined to be in the range of $7.3 \times 10^{-6}\%$. To the extent present at such reduced levels, any residual carbamate was observed to have no significant adverse impact on the conductivity of the ink of Example 1, or on the clarity of the coatings of Examples 2 and 3.

Zwitter ion adducts of amines can be formed with materials other than $CO_2$. Carbon disulfide ($CS_2$) also forms stable amine salts, as do hydrogen chloride (HCl) and low boiling temperature organic acids (e.g. acetic acid, formic acid, propionic acid). However, $CO_2$ has the advantage of being of minimal toxicity and is a relatively weak acid, which may be a benefit to some of the coatings being treated.

Another advantage is that few amine carbamates/carbonates are stable much above 100° C. Thus a $CO_2$-based adduct, being easier to break down, has an excellent overall fugitive property.

As an alternative to making an amine adduct and then adding the adduct to a coating (or printing) system, the amine may be added directly to the coating, followed by addition of the $CO_2$, $CS_2$, etc. so as to form the amine adduct in-situ. In all cases, upon drying, the amine carbamate would decarboxylate, and then the amine could be driven off. The temperature needed would depend on the amine and whether or not the regenerated amine was needed to play a roll in maintaining coating "wet out" during the drying process.

The printed or coated mixtures of the present invention may be dried to their functionally dried state by various methods, e.g., thermal drying, air drying, infrared drying, microwave drying and vacuum drying.

Amines useful in the present invention may be selected from the group listed below in Table 1.

TABLE 1

| Amine | B.P. ° C. |
|---|---|
| Morpholine | 129 |
| N-ethyl-n-butyl amine | 91 |
| n-butyl amine | 78 |
| sec-butyl amine | 63 |
| t-butyl amine | 46 |
| n-propyl amine | 48 |
| n-pentyl amine | 104 |
| di-n-butylamine | 129 |
| N-methyl-n-butylamine | 91 |
| Ethylene diamine | 117 |
| AMP (2 amino-2-methyl-1-propanol) | 166 |
| DMEA (dimethyl, ethanol amine) | 135 |

We claim:

1. A method of coating or printing a substrate with a liquid, said method comprising:
   providing a liquid including a conductive ink and having a first viscosity;
   providing an amine-acid adduct that includes amine;
   combining said liquid with said amine-acid adduct to form a mixture having a second viscosity greater than said first viscosity;
   applying said mixture as a deposit on the surface of the substrate; and
   drying the deposit to a functionally dry state in which said amine-acid adduct is substantially completely removed from said deposit.

2. The method of claim 1 wherein said amine-acid adduct comprises more than 10% by weight of said mixture.

3. The method of claim 1 wherein said amine-acid adduct is evaporative to a reduced level of less than about 0.2% by weight of said deposit.

4. The method of claim 3 wherein said reduced level is less than about 0.1% by weight of said deposit.

5. The method of claim 3 wherein said reduced level is less than about 0.01% by weight of said deposit.

6. The method of claim 3 wherein said reduced level is less than about 0.001% by weight of said deposit.

7. The method of claim 1, wherein said drying is achieved by a process selected from the group consisting of thermal drying, air drying, infrared drying, microwave drying and vacuum drying.

8. The method of claim 1 wherein said liquid includes a dispersion of nano particles.

9. The method of claim 8, wherein said nano particles are carbon nanotubes.

10. The method of claim 1, wherein said amine-acid adduct further includes a diluting acrylate.

11. The method of claim 1, wherein the amine-acid adduct includes propyl amine.

12. The method of claim 1, wherein the amine acid adduct includes butyl amine.

13. The method of claim 1, wherein the amine acid adduct includes $CO_2$.

14. The method of claim 1, wherein the amine is a primary or secondary amine.

15. The method of claim 1, wherein the amine is selected from the group consisting of morpholine, N-ethyl-n-butyl amine, n-butyl amine, sec-butyl amine, t-butyl amine, n-propyl amine, n-pentyl amine, di-n-butylamine, N-methyl-n-butylamine, ethylene diamine, 2-amino-2-methyl-1-propanol and di methyl, ethanol amine.

16. The method of claim 1, wherein the amine-acid adduct further includes one of: carbon disulfide ($CS_2$), hydrochloric acid (HCL), or a low boiling temperature organic acid.

17. The method of claim 16, wherein the low boiling temperature organic acid is one of: acetic acid, formic acid, or propionic acid.

18. The method of claim 1, wherein the liquid mixture comprises a hydrocarbon, water, or an alcohol.

19. The method of claim 1, wherein the amine-acid adduct is a carbamate or the carbonate wherein the carbamate or the carbonate is a viscosity control agent that alters the first viscosity of the liquid.

20. A method of coating or printing a substrate with a liquid, said method comprising:
    providing a liquid including carbon nanotubes and having a first viscosity;
    providing an amine-acid adduct that includes amine;
    combining said liquid with said amine-acid adduct to form a mixture having a second viscosity greater than said first viscosity;
    applying said mixture as a deposit on the surface of the substrate; and drying the deposit to a functionally dry state in which said amine-acid adduct is substantially completely removed from said deposit.

21. The method of claim 20 wherein said amine-acid adduct comprises more than 10% by weight of said mixture.

22. The method of claim 20 wherein said amine-acid adduct is evaporative to a reduced level of less than about 0.2% by weight of said deposit.

23. The method of claim 22 wherein said reduced level is less than about 0.1% by weight of said deposit.

24. The method of claim 22 wherein said reduced level is less than about 0.01% by weight of said deposit.

25. The method of claim 22 wherein said reduced level is less than about 0.001% by weight of said deposit.

26. The method of claim 20, wherein said drying is achieved by a process selected from the group consisting of thermal drying, air drying, infrared drying, microwave drying and vacuum drying.

27. The method of claim 20, wherein the amine-acid adduct includes propyl amine.

28. The method of claim 20, wherein the amine acid adduct includes butyl amine.

29. The method of claim 20, wherein the amine acid adduct includes $CO_2$.

30. The method of claim 20, wherein the amine is a primary or secondary amine.

31. The method of claim 20, wherein the amine is selected from the group consisting of morpholine, N-ethyl-n-butyl amine, n-butyl amine, sec-butyl amine, t-butyl amine, n-propyl amine, n-pentyl amine, di-n-butylamine, N-methyl-n-butylamine, ethylene diamine, 2-amino-2-methyl-1-propanol and dimethyl, ethanol amine.

32. The method of claim 20, wherein the amine-acid adduct further includes one of: carbon disulfide ($CS_2$), hydrochloric acid (HCL), or a low boiling temperature organic acid.

33. The method of claim 32, wherein the low boiling temperature organic acid is one of: acetic acid, formic acid, or propionic acid.

34. The method of claim 20, wherein the liquid mixture comprises a hydrocarbon, water, or an alcohol.

35. The method of claim 20, wherein the amine-acid adduct is a carbamate or the carbonate wherein the carbamate or the carbonate is a viscosity control agent that alters the first viscosity of the liquid.

36. A method of coating or printing a substrate with a liquid, said method comprising:
    providing a liquid including an optical coating material and having a first viscosity;

providing an amine-acid adduct;

combining said liquid with said amine-acid adduct to form a mixture having a second viscosity greater than said first viscosity;

applying said mixture as a deposit on the surface of the substrate; and drying the deposit to a functionally dry state in which said amine-acid adduct is substantially completely removed from said deposit.

37. The method of claim 36 wherein said amine-acid adduct comprises more than 10% by weight of said mixture.

38. The method of claim 36 wherein said amine-acid adduct is evaporative to a reduced level of less than about 0.2% by weight of said deposit.

39. The method of claim 38 wherein said reduced level is less than about 0.1% by weight of said deposit.

40. The method of claim 38 wherein said reduced level is less than about 0.01% by weight of said deposit.

41. The method of claim 38 wherein said reduced level is less than about 0.001% by weight of said deposit.

42. The method of claim 36, wherein said drying is achieved by a process selected from the group consisting of thermal drying, air drying, infrared drying, microwave drying and vacuum drying.

43. The method of claim 36 wherein said liquid includes a dispersion of nano particles.

44. The method of claim 43, wherein said nano particles are carbon nanotubes.

45. The method of claim 36, wherein said amine-acid adduct further includes a diluting acrylate.

46. The method of claim 36, wherein the amine-acid adduct includes propyl amine.

47. The method of claim 36, wherein the amine acid adduct includes butyl amine.

48. The method of claim 36, wherein the amine is a primary or secondary amine.

49. The method of claim 36, wherein the amine is selected from the group consisting of morpholine, N-ethyl-n-butyl amine, n-butyl amine, sec-butyl amine, t-butyl amine, n-propyl amine, n-pentyl amine, di-n-butylamine, N-methyl-n-butylamine, ethylene diamine, 2-amino-2-methyl-1-propanol and dimethyl, ethanol amine.

50. The method of claim 36, wherein the amine-acid adduct further includes one of: carbon disulfide ($CS_2$), hydrochloric acid (HCL), or a low boiling temperature organic acid.

51. The method of claim 50, wherein the low boiling temperature organic acid is one of: acetic acid, formic acid, or propionic acid.

52. The method of claim 36, wherein the liquid mixture comprises a hydrocarbon, water, or an alcohol.

53. The method of claim 36, wherein the amine-acid adduct is a carbamate or the carbonate wherein the carbamate or the carbonate is a viscosity control agent that alters the first viscosity of the liquid.

54. The method of claim 36, wherein the amine acid adduct includes $CO_2$.

* * * * *

UNITED STATES PATENT AND TRADEMARK OFFICE
CERTIFICATE OF CORRECTION

PATENT NO. : 9,777,168 B2
APPLICATION NO. : 12/894526
DATED : October 3, 2017
INVENTOR(S) : Bielek et al.

It is certified that error appears in the above-identified patent and that said Letters Patent is hereby corrected as shown below:

Please correct Column 5, Lines 63-64 to read "2-amino-2-methyl-1-propanol, and dimethyl ethanol amine."

Please correct Column 6, Lines 49-50 to read "2-amino-2-methyl-1-propanol, and dimethyl ethanol amine."

Please correct Column 8, Lines 11-12 to read "2-amino-2-methyl-1-propanol, and dimethyl ethanol amine."

Signed and Sealed this
Twenty-first Day of November, 2017

Joseph Matal
*Performing the Functions and Duties of the*
*Under Secretary of Commerce for Intellectual Property and*
*Director of the United States Patent and Trademark Office*